(12) United States Patent
Coe

(10) Patent No.: US 6,183,154 B1
(45) Date of Patent: Feb. 6, 2001

(54) DISPENSER WITH METERING DEVICE

(75) Inventor: Craig M. Coe, Buzzards Bay, MA (US)

(73) Assignee: The Gillette Company, Boston, MA (US)

(*) Notice: Under 35 U.S.C. 154(b), the term of this patent shall be extended for 0 days.

(21) Appl. No.: 09/274,896

(22) Filed: Mar. 23, 1999

(51) Int. Cl.[7] .................................................. B05C 21/00
(52) U.S. Cl. ............................................ 401/196; 222/456
(58) Field of Search ..................................... 222/456, 454, 222/455; 401/196

(56) References Cited

U.S. PATENT DOCUMENTS

| | | | |
|---|---|---|---|
| 1,280,654 | * 10/1918 | Bream | 222/456 |
| 1,941,745 | * 1/1934 | Higley | 222/456 |
| 2,373,551 | * 4/1945 | Lauder | 222/456 X |
| 2,693,301 | * 11/1954 | Allen, Jr. | 222/456 |
| 2,704,623 | * 3/1955 | Yasso | 222/456 |
| 3,223,295 | * 12/1965 | Falerni et al. | 222/456 X |
| 3,224,652 | * 12/1965 | Ladwig | 222/456 X |
| 3,565,294 | * 2/1971 | Schwartzman | 401/196 X |
| 4,111,567 | 9/1978 | Berghahn et al. | |
| 4,424,921 | * 1/1984 | Feuerstein et al. | 222/456 |
| 4,480,940 | 11/1984 | Woodruff | |
| 4,652,163 | * 3/1987 | Karliner et al. | 401/196 X |
| 5,230,579 | 7/1993 | Klawson et al. | |
| 5,449,097 | * 9/1995 | Meyer | 222/456 X |
| 5,497,906 | * 3/1996 | Hester | 222/456 |
| 5,810,210 | * 9/1998 | Kelley et al. | 222/456 |
| 5,846,011 | * 12/1998 | Bernstein et al. | 401/196 X |
| 5,876,139 | * 3/1999 | De Laforcade | 401/205 X |

* cited by examiner

Primary Examiner—Kevin Shaver
Assistant Examiner—John Bastianelli
(74) Attorney, Agent, or Firm—Stephan P. Williams

(57) ABSTRACT

A dispenser for fluid material comprising a cylindrical container with a metering device disposed therein. The container comprises a dispensing end and a closed end, while the metering device forms a dispensing cavity separated from a storage cavity at the dispensing end of the container and a metering cavity formed at the closed end of the container. Movement of the container to a position with the closed end disposed downwardly and then to a position with the dispensing end disposed downwardly is effective to cause fluid to flow from the storage cavity into the metering cavity and be metered in a desired quantity into the dispensing cavity.

12 Claims, 4 Drawing Sheets

DISPENSER WITH METERING DEVICE

BACKGROUND OF THE INVENTION

The present invention relates to a dispenser having a metering device, and more particularly to a dispenser for fluid material, such as an antiperspirant, deodorant or aftershave, wherein the material is applied through a porous dome applicator.

There are liquid applicators disclosed in the prior art, many of which have met with commercial success, one of which is the familiar type having a rotating ball which picks up liquid from a container and applies it to the desired surface.

Another type of dispenser is one wherein the applicator comprises a porous or microporous dome or membrane which may be manufactured of a polyurethane foam. Porous members of this type permit the liquid material to flow through the pores when the applicator is provided with a slight pressure, as it is applied to the surface upon which the liquid is to be deposited. This type of applicator has also met with success and has been manufactured in many forms.

However, a porous device of this type will generally deliver varying doses of material depending upon the particular manner in which it is used. It has been found that a uniform dose of material from the container is generally impossible to obtain from usage to usage in that the quantity of material delivered is dependent upon the pressure applied while dispensing the material, as well as the rigidity of the surface upon which the material is to be applied.

It is, therefore, an object of the present invention to provide a dispenser for fluid material which is effective to provide a uniform dosage of the material dispensed during successive applications.

Another object of the invention is to provide a dispenser for fluid material having a metering device which is both simple in construction and economical to manufacture.

A further object of the invention is to provide a dispenser of the type discussed which has a metering device adaptable for materials presently in use which are applied through a porous applicator.

Yet another object of the invention is to provide a dispenser having a metering device which may be installed in containers of a size and type generally in commercial use, and employed in the field of fluid dispensing.

SUMMARY OF THE INVENTION

The above objects and other objectives which will become apparent as the description proceeds are accomplished by providing a dispenser assembly for fluid material comprising a container having a closed end and an opposed dispensing end. A metering device is disposed in the container, the metering device having wall structure forming a dispensing cavity and a metering cavity, each separated from a storage cavity within the container. Wall structure is disposed between the metering cavity and the dispensing cavity for restricting flow of material between the metering cavity and the dispensing cavity.

The wall structure interconnecting the metering cavity with the dispensing cavity comprises a tubular element having one end extending into the metering cavity, and the wall structure forming the metering cavity is generally conical in shape having the smaller end disposed adjacent the dispensing cavity, while the wall structure forming the metering cavity is conical in shape having its smaller end disposed adjacent the metering cavity.

The wall structure forming the metering cavity has at least one opening formed adjacent the tubular element which interconnects the metering cavity with the storage cavity.

The wall structure forming the metering cavity is generally provided with a plurality of slotted openings formed therein extending toward the dispensing cavity for flow of material between the storage cavity and the metering cavity.

The metering device may also comprise an opening formed between the metering cavity and the dispensing cavity, having a plurality of flanges equally spaced about the opening and extending into the dispensing cavity.

BRIEF DESCRIPTION OF THE DRAWING

Reference is made to the accompanying drawing in which there is shown an illustrative embodiment of the invention from which its novel features and advantages will be apparent, wherein.

DESCRIPTION OF A PREFERRED EMBODIMENT

Figure 1:
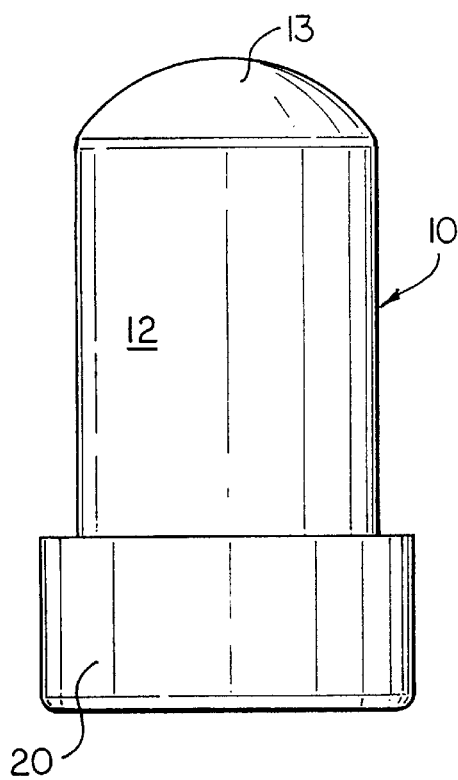
FIG. 1 is an elevational view showing a dispenser assembly constructed in accordance with the teachings of the present invention.
Figure 2:
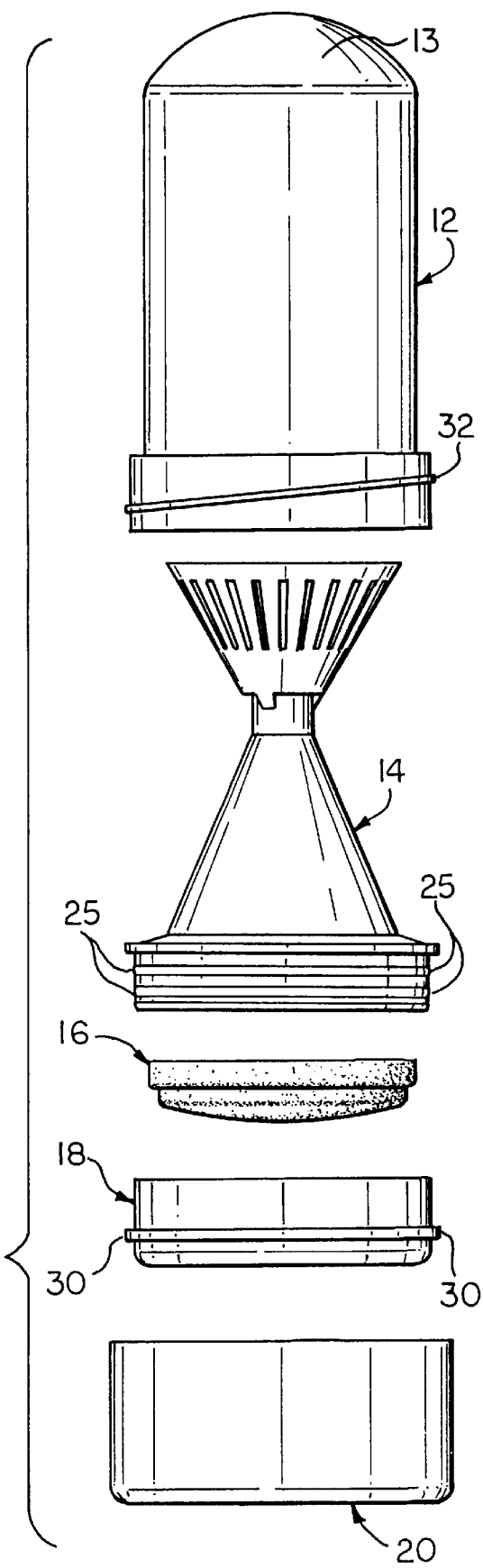
FIG. 2 is an elevational exploded view showing details of elements of the structure of FIG. 1.

Referring now to the drawing and in particular to FIG. 1 and 2 wherein there is shown a dispenser assembly 10 of the type which is employed for dispensing a deodorant material, or the like, in liquid form. The dispenser assembly 10 comprises a container 12 closed at one end by a dome portion 13 and open at the opposite end. The dispenser assembly 10 further comprises a metering device 14 which is assembled into the container 12, an applicator 16 in the form of a circular disk of porous material, a retainer ring 18, and a cylindrical end cap 20.

The container 12, metering device 14, retainer ring 18 and end cap 20 are manufactured of a polypropylene material while the applicator 16 is manufactured of a polyethylene resin material having a porosity of between 20 and 200 microns.

Figure 8:
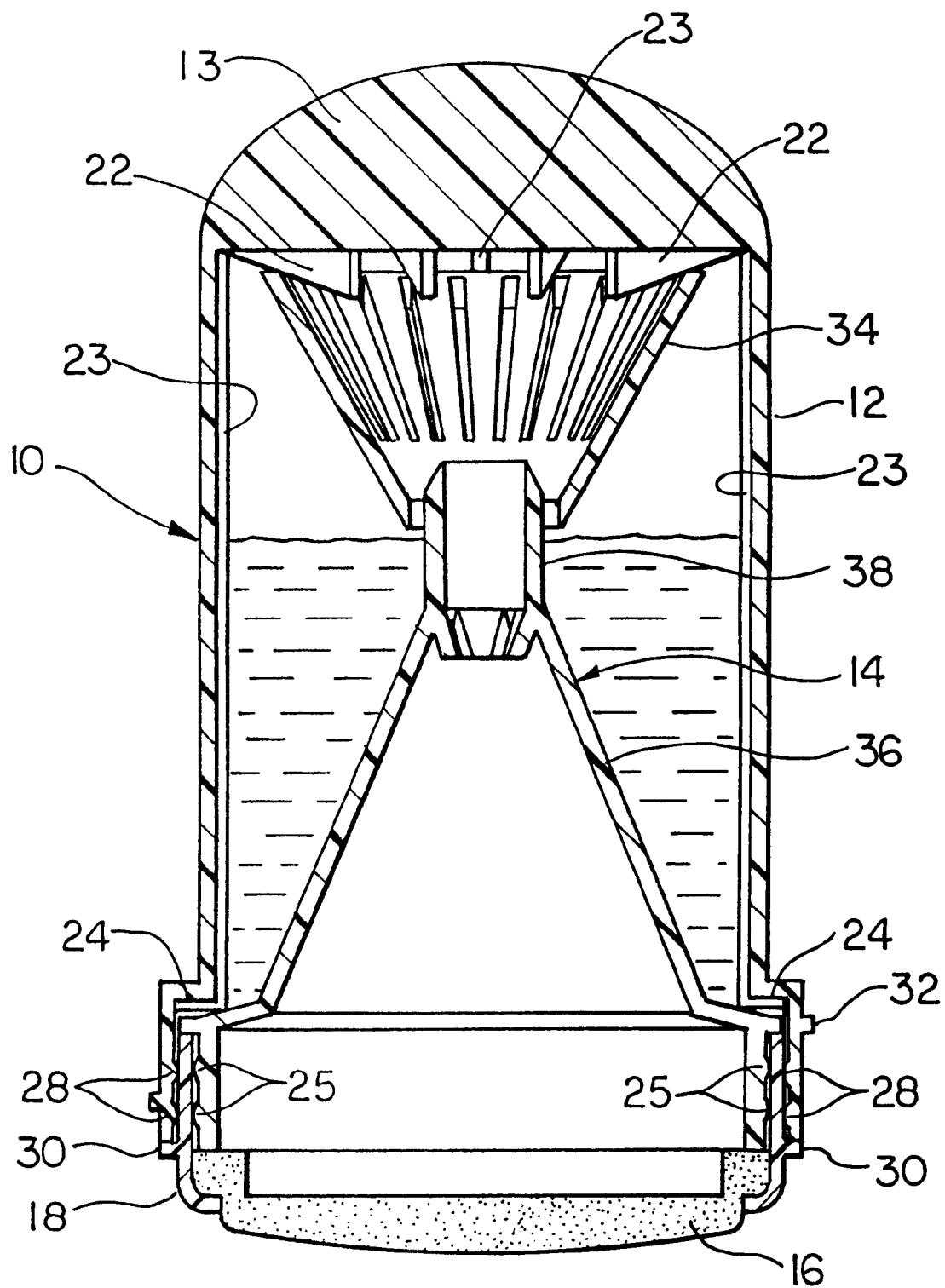
FIG. 8 is an elevational sectional view showing the structure of FIGS. 1 and 2 in the assembled condition.

Referring now to FIG. 8, the dispenser assembly 10 is shown in the assembled condition with the liquid disposed in the assembly. As will be noted, the dome 13 of the container 12 has a plurality of triangular wedges 22 disposed on the inner surface thereof and four elongated spacers 23 (only three of which are shown in FIG. 8) are equally spaced about the inside surface of the container 12, each spacer having a portion 24 extending radially outwardly at their lower ends.

In assembling the various components of the dispenser assembly 10, the applicator 16 is first placed adjacent the opening at the bottom of the metering device 14, and the retainer ring 18 is snapped over the applicator and the lower outer surface of the metering device 14. It will be noted that the outer surface of the metering device 14 is provided with a plurality of outwardly extending ridges 25, and the inner diameter of the retainer ring 18 is such that there is a force-fit between the retainer ring and the ridges 25 resulting in the applicator 16 being firmly clamped over the lower opening in the metering device 14.

Referring still to FIG. 8, taken in conjunction with FIG. 2, during the assembly of the metering device 14, applicator 16 and retainer ring 18 are placed into the container 12 and, as best shown in FIG. 8, the outer surface of the retainer ring 18 contacts a plurality of ridges 28 formed on the inner surface of the open end of the container 12. The retainer ring 18 has an outwardly projecting shoulder 30 which sealingly engages the bottom surface of the container 12 while the metering device 14 contacts the outwardly projecting portions 24 of the spacers 23. The upwardly facing surface of the metering device contacts each of the wedges 22 which maintains the metering device in spaced relation with the inner surface of the dome 13.

With the assembly as shown in FIG. 8, the cap 20 which is provided with an internal thread (not shown) is screwed onto the container 12 which is provided with a mating thread 32, shown in FIGS. 2 and 8.

Figure 4:
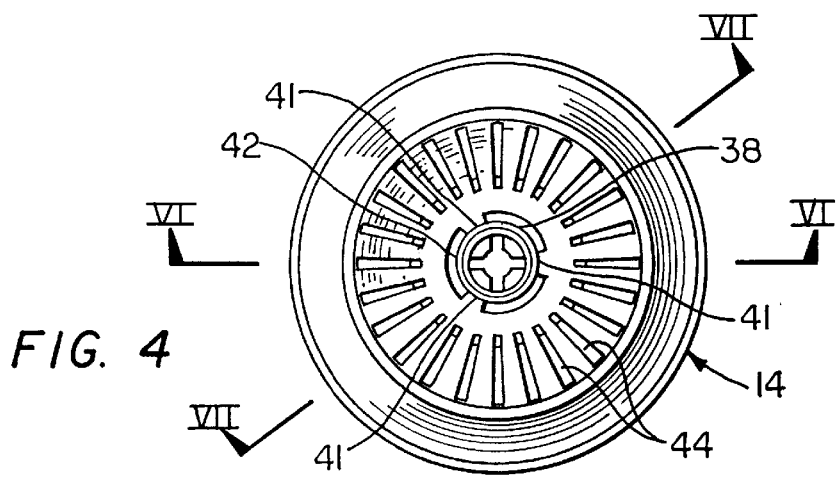
FIG. 4 is a top plan view showing details of the structure of FIG. 3.
Figure 3:
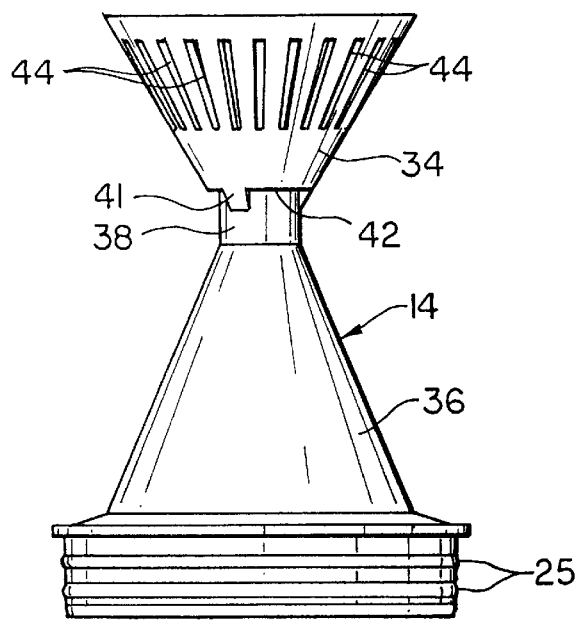
FIG. 3 is an elevational view showing details of the metering device which is one of the elements of FIG. 2.
Figure 5:
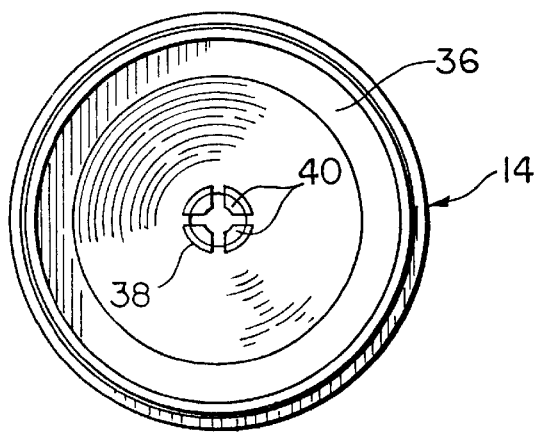
FIG. 5 is a bottom plan view showing further details of the structure of FIGS. 3 and 4.
Figure 7:
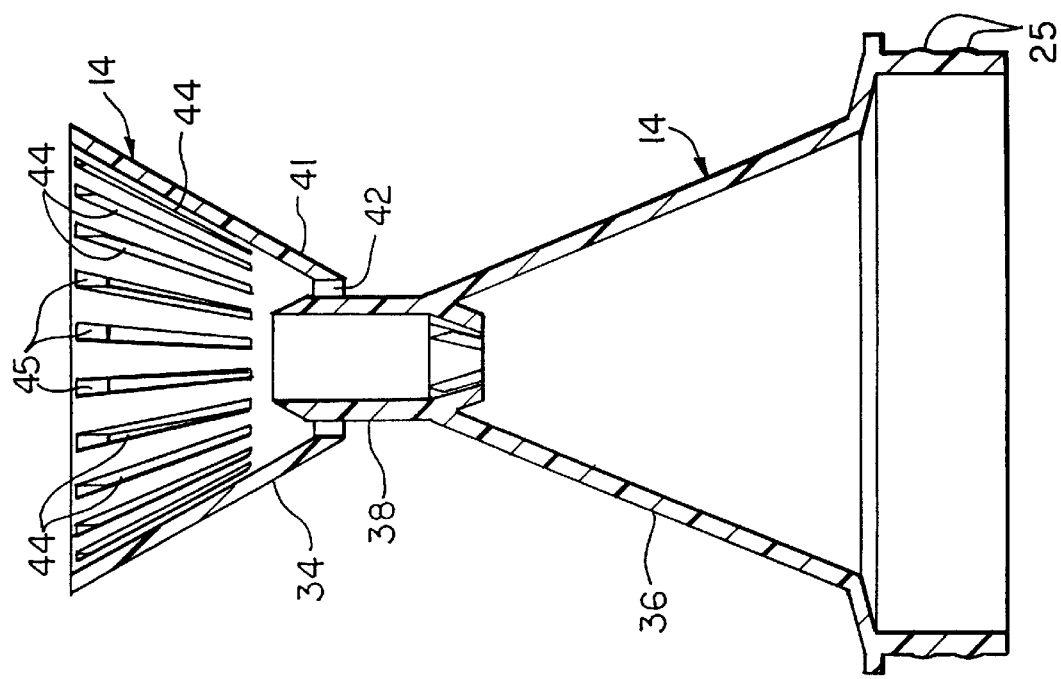
FIG. 7 is an elevational sectional view taken along the line VII—VII of FIG. 4 showing further details of those portions of the structure of FIGS. 3 through 5 and depicted in FIG. 6.
Figure 6:
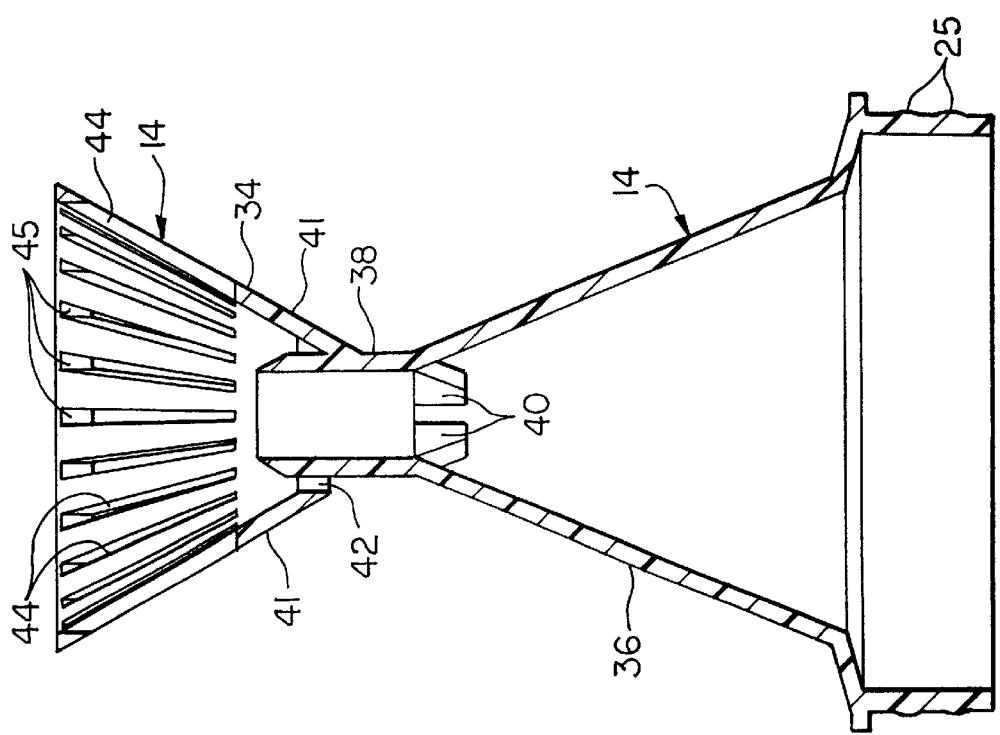
FIG. 6 is an elevational sectional view taken along the line VI—VI of FIG. 4 showing portions of the structure of FIGS. 3 through 5 in greater detail.

Referring now to FIGS. 3 through 7, the metering device 14 is shown to comprise wall structure forming an upper conical-shaped element 34 forming a metering cavity and a lower conical-shaped element 36 forming a dispensing cavity at the lower end of the metering device. A metering tube 38 connects the smaller end of the conical-shaped element 34 to the smaller end of the conical-shaped element 36 and has an upper end thereof extending into the cavity formed in the upper conical-shaped element 34 for a predetermined distance. The lower end of the metering tube 38 is provided with a plurality of flanges 40 which extend downwardly and towards one another within the cavity formed by the lower conical-shaped element 36. As best shown in FIG. 3 and 4, the upper conical-shaped element is attached to the metering tube 38 by three webs 41 forming three arcuate slots 42 opening from the interior of the conical-shaped element 34 outwardly into the container 12 when the metering device 14 is disposed in the container. A plurality of elongated slots 44 having a beveled surface 45 disposed at the uppermost end thereof are provided equally spaced about the periphery of the upper conical-shaped element 34.

The operation of the metering device will now be explained with reference to FIG. 8. As depicted in FIG. 8, the liquid material is placed in the container 12 between the inner surface of the container and the outer surface of the lower conical element 36, the material being of a quantity to maintain the upper material surface below the upper end of the metering tube 38 with the container 12 in the position shown in FIG. 8.

When it is desired to use the dispenser assembly 10 to dispense a chosen material, the container 12 is inverted to a position where the conical-shaped element 34 is in the downward-most position and the conical-shaped element 36 is in an upwardmost position, resulting in the material flowing to that portion of the container surrounding the conical-shaped element 34 and flowing along the inner surface of the dome 13 of the container 12. As is evident, the material is free to flow between the inner surface of the dome 13 and the conical-shaped element 34, and also through the openings formed by the elongated slots 44.

When the container 12 is reinverted to the position shown in FIG. 8, a large portion of the material will flow back along the inner sides of the container to assume the position shown in FIG. 8, while a portion of the material will flow along the inner surface of the conical-shaped element 34 which serves somewhat as a funnel.

Of the material flowing along the inner surfaces of the conical-shaped element 34, a prescribed amount or dose will accumulate in the metering tube 38, while a substantial amount of the material will flow outwardly through the elongated slots 44 and through the arcuate slots 42 joining that material disposed between the inner surface of the container 12 and the outer surface of the conical-shaped element 36. The amount of material to be metered into the conical-shaped element 36 may be adjusted by changing the inner volume of the metering tube 38, as well as locating the flanges 40 to form a more, or less, restrictive path to meter the material from the conical-shaped element 34 into the conical-shaped element 36 when the container 12 is turned to the position shown in FIG. 8.

With the proper dosage of the material in the conical-shaped element 36 and contacting the applicator 16, the user is now capable of applying the proper amount or dose of material which has been metered onto the applicator 16 without having an overabundance of material available which would be incapable of use.

It should be understood that although the elements 34 and 36 have been shown and described as conical in shape, various other enfigurations may be employed without departing from the scope of the inventive concept.

While it is apparent that changes and modifications can be made within the spirit and scope of the present invention, it is my intention, however, only to be limited by the appended claims.

As my invention I claim:

1. A dispenser assembly for fluid material comprising a container having a container wall with a closed end and an opposed dispensing end with a porous applicator head affixed thereto;

a metering device disposed within the container and extending from the closed end to the applicator head, thereby forming a storage cavity for the fluid material between the container wall and the metering device;

the metering device having a first wall structure forming a conically shaped dispensing cavity with a wide end at the applicator head and a narrow end inwardly disposed, a second wall structure forming a conically shaped metering cavity with a wide end at the closed end and a narrow end inwardly disposed, and a third wall structure forming a narrow tubular element interconnecting the narrow end of the metering cavity with the narrow end of the dispensing cavity to partially restrict flow of fluid material therebetween;

a first plurality of openings in the second wall structure in the vicinity of the wide end of the metering cavity to permit fluid material to enter the metering cavity from the storage cavity when the dispensing end of the container is positioned upward; and a second plurality of openings in the second wall structure in the vicinity of the narrow end of the metering cavity to permit fluid material to exit the metering cavity into the storage cavity when the dispensing end of the container is positioned downward, thereby permitting only an approximately predetermined amount of the fluid material to flow into the dispensing cavity to the applicator head.

2. A dispenser assembly according to claim 1 wherein the tubular element extends partially into the metering cavity such that its uppermost end is above the second plurality of openings.

3. A dispenser assembly according to claim 1 wherein the second plurality of openings comprise arcuate slots disposed about the periphery of the tubular element.

4. A dispenser assembly according to claim 3 wherein the tubular element extends partially into the metering cavity such that its uppermost end is above the arcuate slots.

5. A dispenser assembly according to claim 4 wherein the tubular element comprises a plurality of inwardly disposed flanges that extend into said dispensing cavity.

6. A dispenser assembly according to claim 5 wherein the first plurality of openings comprise elongated slots extending from the wide end of the metering cavity toward the narrow end of the metering cavity.

7. A dispenser assembly according to claim 1 wherein the first plurality of openings comprise elongated slots extending from the wide end of the metering cavity toward the narrow end of the metering cavity.

8. A dispenser assembly according to claim 7 wherein the tubular element extends partially into the metering cavity such that its uppermost end is above the lowermost end of the elongated slots.

9. A dispenser assembly according to claim 8 wherein the tubular element comprises a plurality of inwardly disposed flanges that extend into said dispensing cavity.

10. A dispenser assembly according to claim 1 wherein the first and second plurality of openings are the same and comprise elongated slots extending from the wide end of the metering cavity toward the narrow end of the metering cavity.

11. A dispenser assembly according to claim 10 wherein the tubular element extends partially into the metering cavity such that its uppermost end is above the lowermost end of the elongated slots.

12. A dispenser assembly according to claim 11 wherein the tubular element comprises a plurality of inwardly disposed flanges that extend into said dispensing cavity.

* * * * *